No. 637,075. Patented Nov. 14, 1899.
J. W. BROWN.
LEVER ATTACHMENT.
(Application filed Sept. 2, 1898.)
(No Model.)
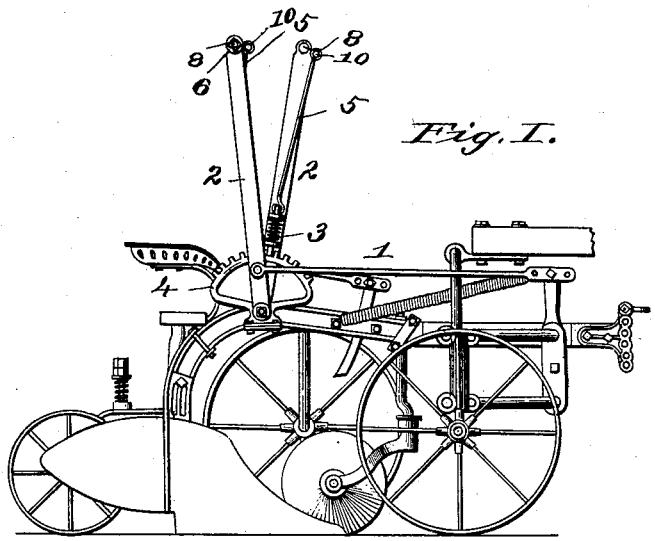
Fig. I.
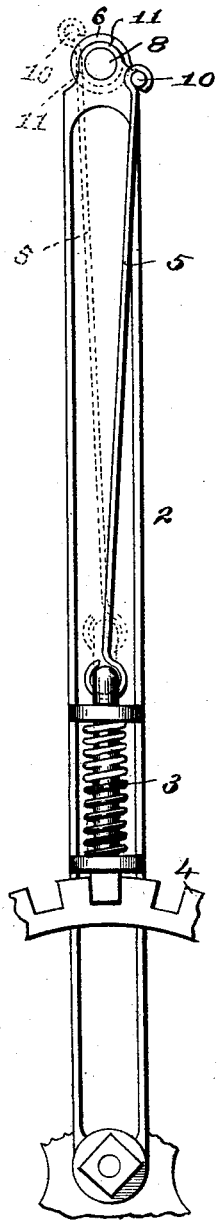
Fig. II.
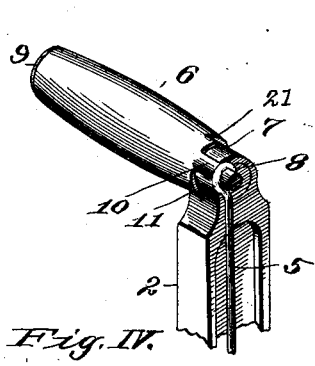
Fig. III.
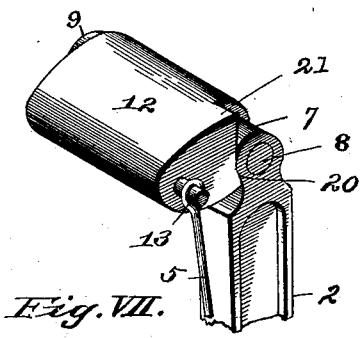
Fig. VI.
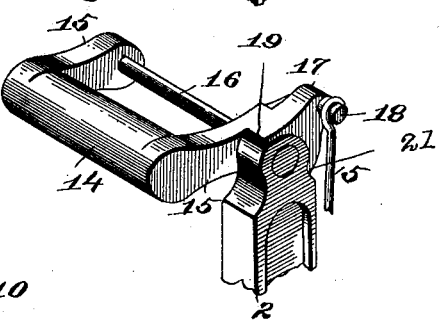
Fig. VII.
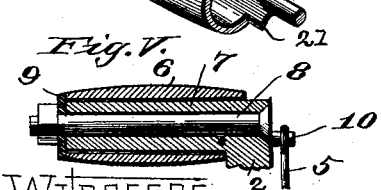
Fig. IV.
Fig. V.
Witnesses
G. A. Taubenschmidt
E. S. Knight
Inventor
John W. Brown,
By Knight Bro*
Attorneys.
THE NORRIS PETERS CO., PHOTO-LITHO., WASHINGTON, D. C.

UNITED STATES PATENT OFFICE.

JOHN W. BROWN, OF QUINCY, ILLINOIS, ASSIGNOR TO THE COLLINS PLOW COMPANY, OF SAME PLACE.

LEVER ATTACHMENT.

SPECIFICATION forming part of Letters Patent No. 637,075, dated November 14, 1899.

Application filed September 2, 1898. Serial No. 690,145. (No model.)

*To all whom it may concern:*

Be it known that I, JOHN W. BROWN, a citizen of the United States, residing at Quincy, in the county of Adams and State of Illinois, have invented certain new and useful Improvements in Lever Attachments, of which the following is a full, clear, and exact description, reference being had to the accompanying drawings, forming part of this specification.

My invention relates to an attachment for levers for use in raising the pawl or dog of the lever, the object of the invention being to provide a device which will make the lever much easier to handle than with the old form of latch for raising the pawl or dog and a device which at the same time furnishes a lock for holding the dog or pawl in its elevated position.

I have shown my attachment applied to a lever for use on sulky-plows; but the attachment may be applied to any form of lifting or shifting levers.

My invention consists in features of novelty hereinafter fully described, and pointed out in the claims.

Figure I is a side view of a sulky-plow to the levers of which my invention is shown applied. Fig. II is an enlarged side view of one of the levers with the attachment applied. Fig. III is a detail perspective view of the upper end of the lever with the attachment in place. Fig. IV is a perspective view of the sleeve of the attachment. Fig. V is a sectional view showing the upper end of the lever and the attachment. Fig. VI represents a modification of my preferred form of attachment. Fig. VII represents another modification.

1 represents a sulky-plow to which I have shown my invention applied.

2 represents the shifting levers of the plow, employed for the purpose of adjusting the two forward wheels of the plow. These levers are provided with the usual spring-dogs 3, engaging racks 4. It has been customary to lift the dogs when a lever is to be moved by means of fingers pivoted to the upper ends of the levers and to which the rods 5 of the dogs are connected. In operating the lever with such pivoted-finger form of attachment it is necessary to grasp the finger and lever and pull the dog out of the rack before moving the lever, and with such finger form of construction the lever cannot be moved any considerable distance without the operator shifting the position of his hand, and, moreover, with such finger form of attachment there is no means of locking the dog in its raised position unless the finger be tied up against the lever, which would take time both to do and undo.

My attachment consists of a rocker secured to the upper end of the lever and to which the rod 5 is eccentrically connected—that is to say, the rod is secured to the rocker to one side of the axis or center of the latter. In Figs. I to V, I have shown this rocker in the form of a sleeve 6, fitting loosely on a pin or projection 7, extending transversely from the upper end of the lever, and I have shown the sleeve held on the pin or projection by means of a bolt 8 and washer 9. The inner end of the sleeve is provided with an eccentrically-arranged finger 10, with which the rod 5 connects. It will thus be seen that by turning the sleeve on its supporting pin or projection 10 the dog 3 will be raised out of engagement with the rack 4 by a simple movement of the wrist of the hand that grasps the sleeve to move the lever, the sleeve, with the pin or projection 7, serving as the handhold by which the lever is grasped. Should it be desired to retain the dog in its elevated position, the sleeve may be turned beyond the vertical line of its axis, as shown by dotted lines, Fig. II, when a shoulder 11 on the sleeve will come against the lever and stop the movement of the sleeve, and the dog will thus be automatically locked in its raised position. By thus providing the lever with a rocker that serves as a handhold in moving the lever the lever can be much more conveniently moved than by the use of the old form of pivoted grip arrangement heretofore commonly used.

In Fig. VI, I have shown a modification wherein the rocker is in the form of a block 12, connected to the lever by means of the pin or projection 7 and bolt 8. On this block is a pin or stud 13, eccentrically arranged with relation to the pivotal axis of the block, and to this pin the rod 5 is connected.

In Fig. VII, I have shown the rocker consisting of a handpiece 14, having arms 15 connected to the upper end of the lever by a bolt 16, one of the arms being extended beyond the lever, as shown at 17, and provided with a pin 18, to which the rod 5 is connected. Of course the arms 15 fit loosely on the bolt 16, so that the handpiece can be rocked to lift the dog. The inner arm 15 has a shoulder 19, corresponding in function to the shoulder 11 on the sleeve 6, and in like manner the block 12 of the modification shown in Fig. VI is provided with a shoulder 20. The shoulder 21 on the rockers coming against the shifting lever limits their inward movement.

I claim as my invention—

1. An attachment for levers, consisting of a horizontally-arranged rocker to which the pawl or dog of the lever is pivoted eccentrically directly to one end thereof, with relation to the axis of the rocker; substantially as described.

2. In an attachment for levers a rocker having a pin located at one end thereof eccentrically located with relation to the axis of the horizontally-arranged rocker and to which the dog of the lever is pivotally connected; substantially as described.

3. An attachment for levers, consisting of a sleeve loosely connected to the free end of the lever and provided with a pin or projection eccentrically located with relation to the axis of the sleeve and to which the dog of the lever is adapted to be pivotally connected; substantially as described.

4. The combination of a lever, having a dog or pawl a sleeve loosely mounted on the free end of the lever and a rod pivotally connecting the dog to the sleeve, eccentrically with the axis of the sleeve; substantially as described.

5. The combination of a lever, rocker mounted on free end of the lever and a dog pivotally connected to the rocker, eccentrically of the axis of the latter, said rocker having a shoulder adapted to contact with the lever to lock the dog in its raised position; substantially as described.

6. A lever attachment comprising a lever having a pin or projection, a locking-dog, a rocker formed with shoulders abutting against the lever to limit its movement in opposite directions, an eccentric-pin secured to the rocker, and a connection between the locking-dog and the eccentric-pin; substantially as described.

In testimony whereof I have hereunto affixed my signature this 24th day of August, 1898.

JOHN W. BROWN.

In presence of—
D. F. McNay,
B. B. Lummis.